April 22, 1930.  H. W. DEISLER  1,755,537
SPRING CASTER
Filed Dec. 5, 1928  2 Sheets-Sheet 1

Inventor
H. W. Deisler
By Hull Brock & West
Attorney

April 22, 1930.  H. W. DEISLER  1,755,537
SPRING CASTER
Filed Dec. 5, 1928   2 Sheets-Sheet 2

Patented Apr. 22, 1930

1,755,537

UNITED STATES PATENT OFFICE

HARRY W. DEISLER, OF WELLINGTON, OHIO, ASSIGNOR TO THE WELLINGTON MACHINE COMPANY, OF WELLINGTON, OHIO, A CORPORATION OF OHIO

SPRING CASTER

REISSUED

Application filed December 5, 1928. Serial No. 323,990.

This invention relates generally to casters and more particularly to what may be termed a spring caster inasmuch as the caster wheel is arranged between the ends of two leaf springs projecting from a bracket which is suitably secured to the article supported.

The object of the invention is to provide a simple form of caster such as is used upon hand trucks and which will be so constructed as to provide a spring or yielding member as a part of the caster which will materially cheapen the construction of a truck over any other method of applying springs to a truck when a rigid caster is employed and furthermore, provide a means for cushioning or absorbing the shock of any merchandise being transported.

The invention consists in the novel features of construction and in the manner of combining or arranging the same all of which will be fully described hereinafter and pointed out in the appended claims.

Figure 1:
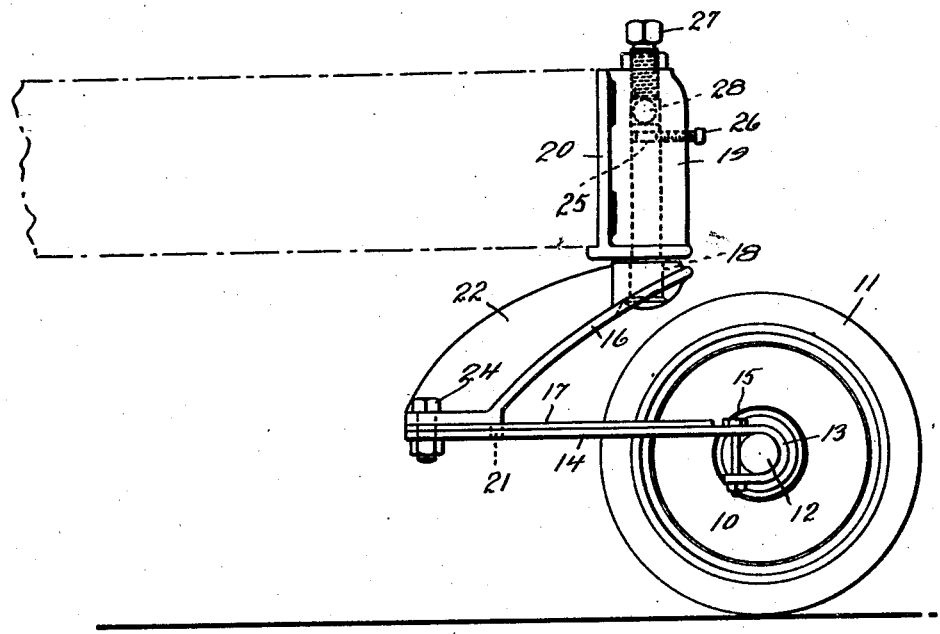
Figure 2:
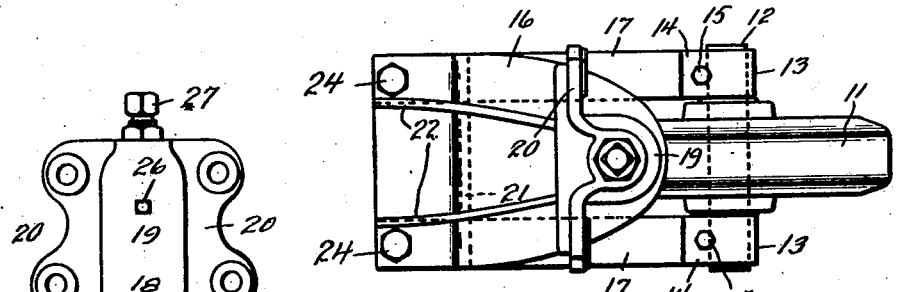
Figure 3:
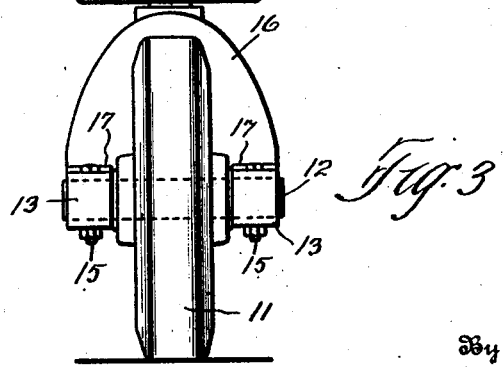
Figure 4:
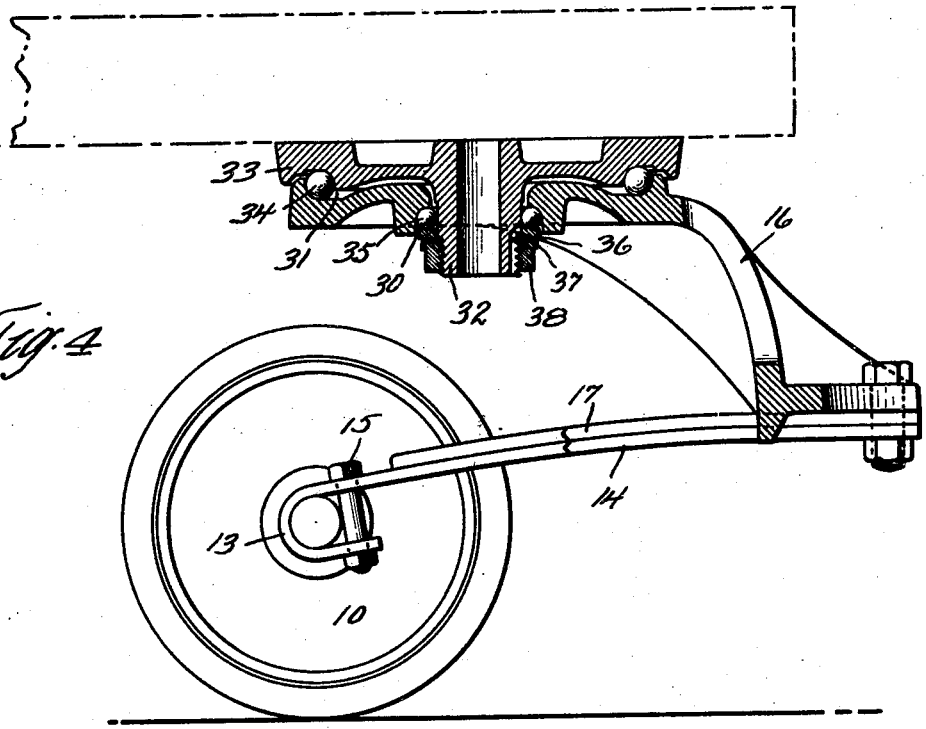
Figure 5:
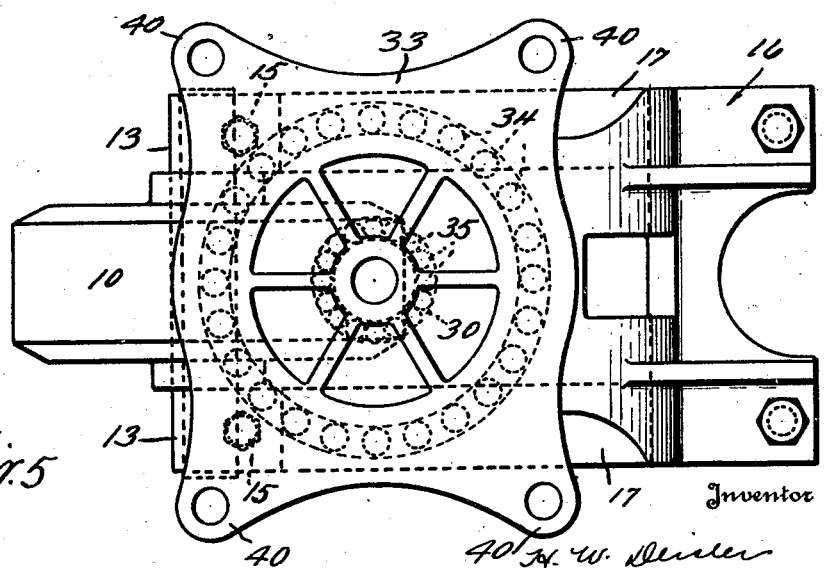

In the drawings forming a part of this specification Fig. 1 is a side view of a spring caster constructed in accordance with one form of my invention; Fig. 2 is a top plan view of the same; Fig. 3 is a front view of the same; Fig. 4 is an elevation partly in section of a second form of spring caster of the swivel plate type; and Fig. 5 is a top plan view of the form illustrated in Fig. 4.

Describing the embodiments of my invention as illustrated in the accompanying drawings, considering first the form of caster shown on Sheet one, 10 designates the wheel of the caster which may be of any desired construction mounted for rotation on an axle 12. The ends of the axle 12 are secured in the bent back ends 13 of the leaf spring 14, by the bolts 15 which pass therethrough as illustrated clearly in Fig. 1.

The inner ends of the leaf springs 14 are secured to the bottom of a bracket 16. Each of the spring arms 14 may be reinforced with one or more additional leaves 17, the number of additional leaves used depending on the loads for which the particular casters are to be used, the springs 14 and additional leaves 17 being secured to the bracket 16 by bolts 24. Depending from the bracket 16 is a lug or rib 21 against which the sides of the springs 14 abut when bolted in place to properly space the springs and prevent any lateral shifting of the same. For reinforcement of the bracket the ribs 22 are provided.

Extending upwardly from the top end of the bracket 16 is a king bolt 18 which is swiveled in a bearing member 19 which is provided with apertured flanges 20 for attaching the same to the truck or other device on which the caster is to be used. The king bolt 18 is secured in the bearing by means of a groove 25 in the pin into which a set screw 26 in the bearing member extends. To receive the end thrust of the king bolt 18, a ball 28 is arranged in the end of the bearing member and bears against an adjusting screw 27.

In the modification shown on Sheet two of the drawings, the wheel and spring assembly is the same as that shown on Sheet one and as described above. In this form however, the upper end of the bracket 16 is provided with a central aperture about which is formed a ball race 30 on the underside of the bracket. On the top of the bracket 16 and concentric with the central aperture is a second ball race 31 of a substantially greater diameter than the lower ball race. Secured to the bracket by means of a threaded boss 32 extending through the aperture therein, is a swivel plate 33 provided with a ball race on its underside which together with the ball race 31 on the bracket receives the balls 34 and provides a bearing to take the load and permits easy swiveling of the said caster under very heavy loads. Around the boss 32 and received in the lower ball race on the bracket 16 are balls 35 held in place by bearing member 36, lock washer 37 and nut 38. This lower bearing takes the lateral thrust of the load on the caster and prevents any binding of the same. The swivel plate is provided with apertured ears 40 for attaching the same to the underside of the truck or other device on which it is to be used.

It will be seen that I provide a simple and efficient form of caster which will absorb shocks and render the movement of the article as a whole easier and smoother.

Having thus described my invention, what I claim is:—

1. The combination with a housing, of a king bolt journaled therein, a bracket connected to the lower end of said king bolt and rotatable therewith, and spring arms fastened to the bracket, and a caster wheel arranged between and carried by the free ends of said spring arms.

2. The combination with a caster wheel having laterally projecting axle ends, of a pair of spring arms between the ends of which said axle ends are mounted, a king bolt, a housing in which said king bolt rotates, and means connected to the king bolt and to which the spring arms are connected.

3. The combination with a king bolt, of a downwardly extending bracket connected to the lower end of said bolt, spring arms connected to the lower end of said bracket and extending substantially horizontally from said bracket, and a caster wheel mounted between the free ends of said spring arms.

4. In a device of the kind described, the combination with a caster wheel having an axle, of a pair of leaf springs having bent back ends in which the axle of said wheel is mounted, a bracket to which said leaf springs are connected, a king bolt to which said bracket is attached, and means for carrying said king bolt.

5. In a device of the kind described, the combination with a housing, a bolt arranged therein, a bracket carried at the lower end of said king bolt, leaf springs connected to the lower end of said bracket and projecting therefrom, the lowermost springs of the series being bent back upon themselves, a caster wheel positioned between the leaf springs, an axle for said wheel, the ends of said axle being mounted in the bent back ends of the leaf springs, and means for maintaining said axle ends in the curved ends of the leaf springs.

6. In a device of the kind described, the combination with a caster wheel having an axle, leaf springs between which the caster wheel is positioned, the ends of said leaf springs bent back and providing mountings for the ends of the axles, bolts for retaining said axle ends in place, a bracket, the inner ends of the leaf springs being connected to the bottom of said bracket, a housing and a king bolt arranged in said housing, the upper end of the bracket being connected with the lower end of the king bolt.

7. A caster comprising a wheel having an axle, a leaf spring secured at one end to said axle, a bracket secured to the opposite end of said spring and a bearing member to which said bracket is swiveled.

8. A caster comprising a wheel having an axle, leaf springs secured at one end to said axle, a bracket secured to the opposite ends of said leaf springs, and a bearing member to which said bracket is swiveled.

9. A caster comprising a wheel having an axle the ends of which extend on opposite sides of said wheel, a pair of leaf springs each having one end secured to said axle, one on each side of said wheel, a bracket to which the opposite ends of said springs are secured, means to prevent lateral movement of said springs on said bracket, and a bearing member to which said bracket is swiveled, said bearing member provided with means for attaching the same to a load.

10. A caster comprising a wheel having an axle the ends of which extend on opposite sides of said wheel, a pair of leaf springs each having one end bent back forming a U-portion in which the ends of said axle are mounted, a bracket member to which the other end of each spring is secured, and a bearing member to which the opposite end of said bracket is swiveled.

In testimony whereof, I hereunto affix my signature.

H. W. DEISLER.